United States Patent
Kanno

(10) Patent No.: US 11,420,615 B2
(45) Date of Patent: Aug. 23, 2022

(54) POWERTRAIN SYSTEM

(71) Applicant: TOYOTA JIDOSHA KABUSHIKI KAISHA, Toyota (JP)

(72) Inventor: Yoshihito Kanno, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 17/011,553

(22) Filed: Sep. 3, 2020

(65) Prior Publication Data
US 2021/0122356 A1    Apr. 29, 2021

(30) Foreign Application Priority Data
Oct. 23, 2019 (JP) ............... JP2019-193051

(51) Int. Cl.
| | |
|---|---|
| *B60W 20/19* | (2016.01) |
| *B60W 10/06* | (2006.01) |
| *B60W 10/24* | (2006.01) |
| *B60W 10/08* | (2006.01) |
| *B60W 20/17* | (2016.01) |

(52) U.S. Cl.
CPC ............ *B60W 20/19* (2016.01); *B60W 10/06* (2013.01); *B60W 10/08* (2013.01); *B60W 10/24* (2013.01); *B60W 20/17* (2016.01); *B60W 2510/0638* (2013.01)

(58) Field of Classification Search
CPC ...... B60W 20/19; B60W 10/06; B60W 10/08; B60W 10/24; B60W 20/17; B60W 2510/0638; B60W 2540/10; B60W 2710/0677; B60W 2710/0644
See application file for complete search history.

(56) References Cited

U.S. PATENT DOCUMENTS

| | | | |
|---|---|---|---|
| 2013/0085633 A1* | 4/2013 | Ohno .................... | B60W 10/06 180/65.265 |
| 2016/0082826 A1* | 3/2016 | Aoki ................. | B60W 30/1882 180/65.23 |
| 2019/0184965 A1* | 6/2019 | Kamatani ............. | B60W 10/08 |

FOREIGN PATENT DOCUMENTS

| | | | | |
|---|---|---|---|---|
| EP | 3216638 A1 * | 9/2017 | ............... | B60K 1/02 |
| JP | H05-229351 A | 9/1993 | | |

\* cited by examiner

*Primary Examiner* — Richard W Ridley
*Assistant Examiner* — Aimee Tran Nguyen
(74) *Attorney, Agent, or Firm* — Oliff PLC

(57) ABSTRACT

A powertrain system includes a control device configured, where an engine speed at the time of detection of an acceleration request with a high acceleration request index value is lower than a specific engine speed, to: set the specific engine speed as an initial target engine speed for an acceleration associated with the acceleration request; and in a first acceleration time period before reaching the initial target engine speed, control an internal combustion engine in accordance with a first target engine power based on the initial target engine speed and supply, to an electric motor, a battery power corresponding to a difference obtained by subtracting the first target engine power from a required vehicle power. The specific engine speed is a value predetermined as a lower limit value of an engine speed range in which engine sound of the internal combustion engine is heard inside the vehicle.

5 Claims, 8 Drawing Sheets

First Embodiment

Second Embodiment

POWERTRAIN SYSTEM

CROSS-REFERENCE TO RELATED APPLICATION

The present disclosure claims priority under 35 U.S.C. § 119 to Japanese Patent Application No. 2019-193051, filed on Oct. 23, 2019. The content of which is incorporated herein by reference in its entirety.

BACKGROUND

Technical Field

The present disclosure relates to a powertrain system, and more particularly to a powertrain system mounted on a hybrid vehicle having an internal combustion engine and an electric motor as drive sources thereof.

Background Art

For example, JP H05-229351 A discloses a hybrid vehicle having an internal combustion engine and an electric motor (motor generator) as drive sources thereof.

SUMMARY

In order to improve the feeling of acceleration in a hybrid vehicle having an internal combustion engine and an electric motor as drive source thereof as disclosed in JP H05-229351 A, it is required to appropriately make it difficult for an occupant to receive a feeling that the vehicle speed does not increase although the engine speed increases (i.e., a so-called rubber band feeling).

The present disclosure has been made in view of the problem described above, and an object of the present disclosure is to provide a powertrain system including an internal combustion engine and electric motor to drive a vehicle, which can reduce the rubber band feeling to improve the feeling of acceleration.

A powertrain system according to the present disclosure includes: an internal combustion engine configured to drive a vehicle; an electric motor configured to drive the vehicle; a battery configured to store electric power supplied to the electric motor; and a control device configured to control the internal combustion engine and the electric motor. The control device is configured, where an engine speed at the time of detection of an acceleration request in which an acceleration request index value correlated with a required vehicle power is greater than or equal to a threshold value is lower than a specific engine speed, to: set the specific engine speed as an initial target engine speed for an acceleration associated with the acceleration request; and in a first acceleration time period being an acceleration time period before reaching the initial target engine speed, control the internal combustion engine in accordance with a first target engine power based on the initial target engine speed and supply, to the electric motor, a battery power corresponding to a difference obtained by subtracting the first target engine power from the required vehicle power. The specific engine speed is a value predetermined as a lower limit value of an engine speed range in which engine sound of the internal combustion engine is heard inside the vehicle.

The higher a speed of the vehicle is, the higher the specific engine speed may be.

The control device may be further configured to limit a time change rate of the engine speed in a second acceleration time period at or after reaching the initial target engine speed such that the time change rate in the second acceleration time period becomes lower than the time change rate in the first acceleration time period.

The powertrain system may be configured to charge, into the battery, electric power generated by an engine power of the internal combustion engine. The control device may be further configured, in the second acceleration time period, to: set a target engine speed based on an engine speed change index value being a rate of increase in the engine speed with respect to an increase in a speed of the vehicle while using the initial target engine speed as an initial value of the target engine speed; control the internal combustion engine in accordance with a second target engine power based on the target engine speed; and supply, to the electric motor, a battery power corresponding to a difference obtained by subtracting the second target engine power from the required vehicle power. Furthermore, the higher the speed of the vehicle is, the higher the engine speed change index value may be.

The control device may be further configured, where the engine speed at the time of detection of the acceleration request is equal to or higher than the specific engine speed, to set the engine speed at the time of detection of the acceleration request as an initial target engine speed for the acceleration associated with the acceleration request.

During acceleration of a vehicle, if the acceleration request index value correlated with the required vehicle power is great, the time change rate of the engine speed at the initial stage of the acceleration is likely to be high. Also, if the time change rate of the engine speed is high immediately after the engine sound starts to be heard during acceleration is high, the occupant easily receives a feeling that the increase of engine sound precedes the rising of the vehicle acceleration G (namely, the rubber band feeling). According to the powertrain system of the present disclosure, where the engine speed at the time of detection of the acceleration request in which the acceleration request index value is equal to or greater than the threshold value is lower than the specific engine speed corresponding to the lower limit value of the engine speed range in which the engine sound is heard inside the vehicle, this specific engine speed is set as the initial target engine speed. Then, in the first acceleration time period before reaching the initial target engine speed, the internal combustion engine is controlled in accordance with the first target engine power based on the initial target engine speed. Thus, it is possible to prevent the engine speed from inadvertently exceeding the specific engine speed at the initial stage of the acceleration associated with the acceleration request that requires measures against the rubber band feeling. As a result, the rubber band feeling can be reduced and the feeling of acceleration can be improved. Furthermore, in the first acceleration time period, the battery power corresponding to the difference obtained by subtracting the first target engine power from the required vehicle power is supplied to the electric motor. Therefore, it is possible to take measures against the rubber band feeling without causing a shortage of vehicle power caused by using the initial target engine speed described above.

DETAILED DESCRIPTION

It is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 9.

1-1. Example of System Configuration

Figure 1:
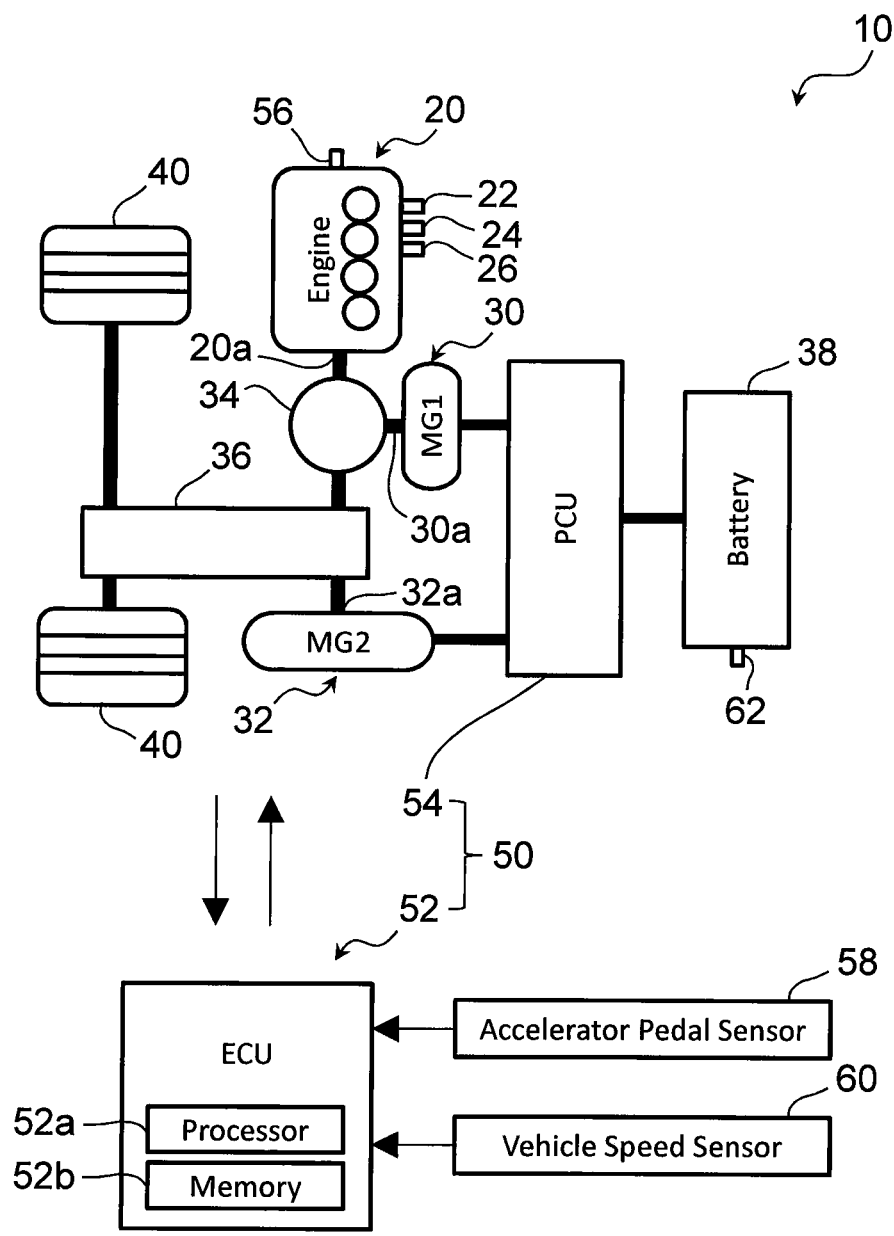
FIG. 1 is a schematic diagram showing a configuration of a powertrain system according to a first embodiment of the present disclosure.

FIG. 1 is a schematic diagram showing a configuration of a powertrain system 10 according to the first embodiment. As an example, the powertrain system 10 shown in FIG. 1 is configured as a power split hybrid system. The powertrain system 10 is provided with an internal combustion engine 20, a first motor generator 30 (MG1), a second motor generator 32 (MG2), a power split device 34, a speed reducer 36, a battery 38 and a control device 50.

The internal combustion engine 20 is a spark ignition engine as an example and, is equipped with a throttle valve 22, fuel injection valves 24 and an ignition device 26 as actuators for controlling engine torque Te. The MG1 and MG2 are, for example, three-phase AC type motor generators. The MG1 is mainly used as a generator, and the MG2 is mainly used as an electric motor configured to drive the vehicle.

The power split device 34 splits the engine torque Te into the MG1 and vehicle wheels 40. The power split device 34 is configured by, for example, a planetary gear unit. To be more specific, a rotation shaft 30a of the MG1 is coupled to a sun gear of the planetary gear unit. A rotation shaft (crankshaft 20a) of the internal combustion engine 20 is coupled to a planetary carrier thereof. A rotation shaft 32a of the MG2 is coupled to a ring gear thereof. The engine torque Te is transmitted to the vehicle wheels 40 via the speed reducer 36. A motor torque Tm outputted from the MG2 is also transmitted to the vehicle wheels 40 via the speed reducer 36. As just described, the powertrain system 10 can use the engine torque Te and the motor torque Tm to drive the vehicle. Furthermore, the MG1 can perform a regenerative power generation using the engine torque Te supplied from the internal combustion engine 20 via the power split device 34, and the MG2 functions as a generator during deceleration of the vehicle, and recovers the kinetic energy of the vehicle to convert it into electric power. It should be noted that, in the example of the powertrain system 10 having this kind of configuration, the MG2 out of the MG1 and MG2 mainly corresponds to an example of the "electric motor" according to the present disclosure.

The control device 50 is configured to control the internal combustion engine 20, the MG1 and the MG2. The control device 50 includes an electronic control unit (ECU) 52 and a power control unit (PCU) 54. The ECU 52 includes a processor 52a and a memory 52b. The memory 52b stores various data including maps used for controlling the internal combustion engine 20, the MG1 and the MG2, and also stores various control programs. The processor 52a receives the control program from the memory 52b and executes it. As a result, various kinds of processing and controls by the control device 50 are achieved.

The PCU 54 is an electric power converter including inverters for driving the MG1 and the MG2, and controls the MG1 and the MG2 on the basis of commands from the ECU 52. The PCU 54 converts the electric power stored in the battery 38 from direct current to alternating current and supplies it to the MG2. The PCU 54 also converts the electric power generated by the MG1 or the MG2 from alternating current to direct current and causes it to be stored in the battery 38. As just described, the battery 38 is charged by the electric power generated by the MG1 and the MG2, and is discharged as a result of the MG2 consuming an electric power.

The ECU 52 receives sensor signals from various sensors for controlling the operation of the powertrain system 10. The Various sensors mentioned here include a crank angle sensor 56 for detecting a crank angle, an accelerator position sensor 58 for detecting the amount of depression of an accelerator pedal (i.e., accelerator position), a vehicle speed sensor 60 for detecting the speed (vehicle speed V) of the vehicle on which the powertrain system 10 is mounted, and an electric current sensor 62 for detecting an electric current flowing through the battery 38. The ECU 52 can calculate an engine speed Ne on the basis of the signals of the crank angle sensor 56. The engine speed Ne may be calculated using a cam angle sensor (not shown). In addition, the electric current sensor 62 is used to calculate the state of charge (SOC) of the battery 38.

1-2. Basic Operation of Powertrain System

The ECU 52 calculates a required vehicle power PvR, which is the vehicle power (vehicle drive power) required by the driver. Calculation of the required vehicle power PvR is typically performed on the basis of the accelerator position Acc and the vehicle speed V. Further, the ECU 52 controls the operation/stop of the internal combustion engine 20 during running of the vehicle such that the system efficiency with respect to the required vehicle power PvR becomes optimum. For example, in an operating condition in which the engine efficiency is not good, such as during a low-speed running, an EV mode is selected. In the EV mode, the internal combustion engine 20 is stopped and the vehicle is driven using only the MG2. Moreover, during normal running, a hybrid mode is selected. In the hybrid mode, the MG1 and the vehicle wheels 40 are driven by the engine torque Te, and the electric power generated by the MG1 is supplied to the MG2 to also drive the vehicle wheels 40 by the motor torque Tm. Furthermore, during acceleration, in order to demonstrate high power performance, the hybrid mode is performed while supplying, to the MG2, the electric power from the battery 38 in addition to the electric power from the MG1.

1-3. Powertrain Control During Acceleration

According to the present embodiment, during the acceleration in which the hybrid mode is performed while supplying the electric power from the battery 38 to the MG2, the ECU 52 executes the following acceleration feeling improvement control in order to reduce the rubber band feeling to improve the feeling of acceleration. The main part of this acceleration feeling improvement control is engine speed control as described below.

1-3-1. Outline of Acceleration Feeling Improvement Control

Method of Determining Acceleration Request B

For convenience of explanation, an acceleration request that does not require measures to reduce the rubber band feeling is referred to as an "acceleration request A", and an acceleration request that requires the measures is referred to as an "acceleration request B". According to the acceleration feeling improvement control, when detecting an acceleration request, the ECU 52 first determines whether or not the acceleration request corresponds to the acceleration request B. Whether or not the detected acceleration request corresponds to the acceleration request B is determined on the basis of whether or not an acceleration request is made in which an "acceleration request index value" correlated with the required vehicle power PvR is equal to or greater than a predetermined threshold value.

According to the present embodiment, the required vehicle power PvR itself is used as an example of the "acceleration request index value". Because of this, the ECU 52 determines whether or not the required vehicle power PvR is equal to or greater than a predetermined threshold value TH. The threshold value TH corresponds to a lower limit value of the acceleration request index value that requires a measure to the rubber band feeling in a target vehicle, and is determined in advance by, for example, performing experiments. It should be noted that, instead of the required vehicle power PvR [kW], an accelerator position (i.e., the depression amount of the accelerator pedal) Acc, a required vehicle drive force [N] or a required vehicle acceleration [m/s$^2$], for example, may be used as the acceleration request index value, as long as the acceleration request index value is correlated with the required vehicle power PvR. The required vehicle drive force can be calculated from the required vehicle power PvR and the vehicle speed V. The required vehicle acceleration can be calculated by subtracting the vehicle running resistance (known value) from the required vehicle drive force.

Setting of Specific NeX and Determination Condition (Ne0<NeX)

When the ECU 52 determines that a detected acceleration request is the acceleration request B, the ECU 52 then determines whether or not an engine speed Ne0 at the time of detection of the acceleration request B (more specifically, at the time point of the detection) is less than a "specific engine speed NeX". This engine speed Ne0 is a value calculated based on the signals of the crank angle sensor 56 (i.e., the actual engine speed).

The specific engine speed NeX (hereinafter, abbreviated as a "specific NeX") corresponds to a lower limit value of an engine speed range (an Ne range R described in FIG. 7 and other figures) in which the engine sound is heard inside the vehicle. In other words, the specific engine speed NeX corresponds to a value of the engine speed at which the engine sound starts to be heard in the ears of an occupant in the interior of the vehicle during acceleration. This kind of specific NeX can be determined in advance using, for example, the following method. That is to say, while the vehicle is running at a constant vehicle speed V, the internal combustion engine 20 is started to gradually increase the engine speed Ne, and thereafter, the value of the engine speed at which the occupant (driver or fellow passenger) starts to recognize the engine sound is acquired. Then, the specific NeX is determined based on the acquired value. According to this kind of method, the specific NeX can be determined by considering the background noise in the interior of the vehicle.

To be more specific, the ease of hearing engine noise in the vehicle interior varies with a change in the background noise in the vehicle interior, and the specific NeX becomes higher when the background noise becomes higher. Various factors, such as road noise, wind noise and the sound insulation characteristics of the vehicle, affect the background noise in the vehicle interior, and among them, the vehicle speed V greatly affects the background noise. More specifically, it can be said in general that, when the vehicle speed V increases, the background noise increases, and as a result, the specific NeX increases.

Figure 2:
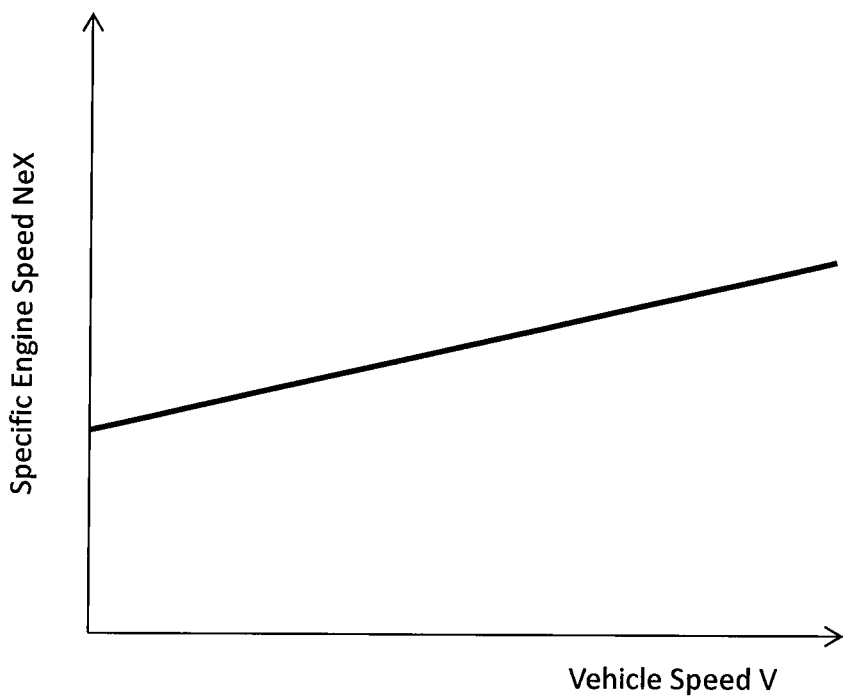
FIG. 2 is a graph showing a setting of a specific engine speed NeX with respect to vehicle speed V used in the first embodiment.

FIG. 2 is a graph showing a setting of the specific NeX with respect to the vehicle speed V used in the first embodiment. According to the present embodiment, as an example, the specific NeX is set, based on the knowledge described above, such that, the higher the vehicle speed V is, the higher specific Nex becomes. In more detail, in the example shown in FIG. 2, the specific NeX is expressed by a linear expression of the vehicle speed V such that the specific Nex linearly becomes higher when the vehicle speed V is higher. As just described, the specific NeX can be expressed practically by using the vehicle speed V as a parameter.

Issue During Acceleration in Response to Acceleration Request B

Figure 3:
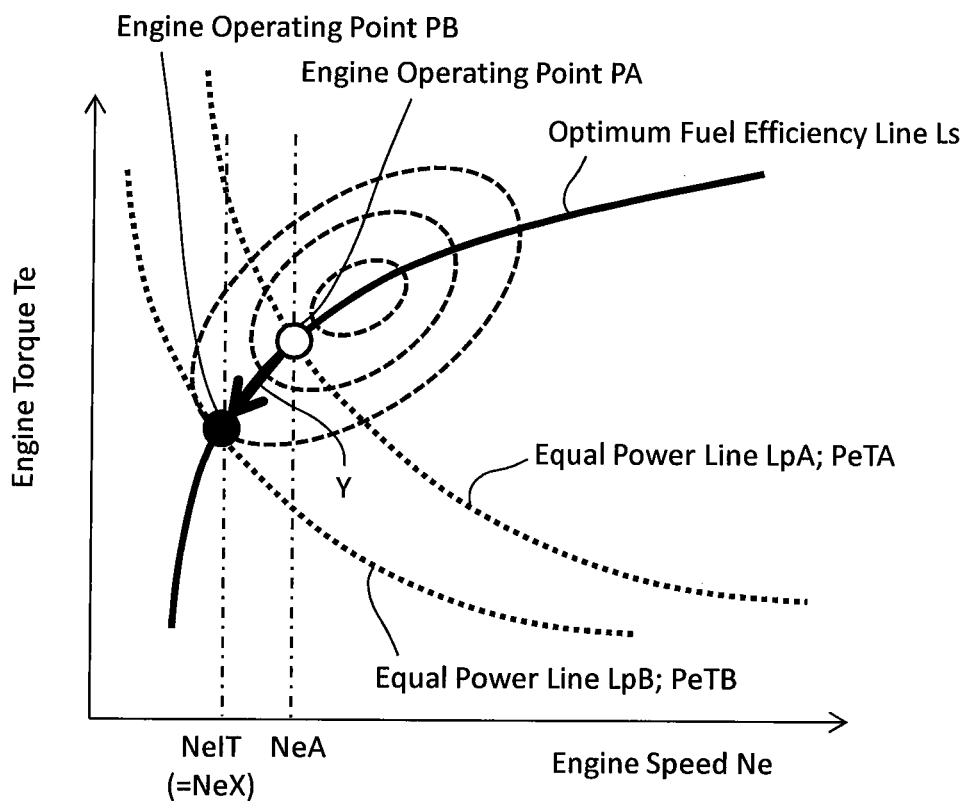
FIG. 3 is a diagram used to describe operating point determination methods A and B.

FIG. 3 is a diagram used to describe operating point determination methods A and B. The engine operating point is determined by the engine torque Te and the engine speed Ne, as shown in FIG. 3. In the powertrain system 10, the engine torque Te and the engine speed Ne of the internal combustion engine 20 is basically controlled such that the engine operating point moves on an optimum fuel efficiency line Ls preset such that the fuel efficiency of the internal combustion engine 20 is optimized.

A method of determining the engine operating point, which is commonly used at the time of acceleration, is herein referred to as the "operating point determination method A". An engine operating point PA in FIG. 3 is an example of the engine operating point determined by the operating point determination method A. According to the operating point determination method A, a value obtained by subtracting a target battery power PbT from the required vehicle power PvR is calculated as a target engine power PeTA. Then, the intersection point between an equal power line LpA associated with this target engine power PeTA and the optimum fuel efficiency line Ls is determined as the engine operating point PA. The target battery power PbT corresponds to a target value of the power (electric power) supplied from the battery 38 to the MG2 during acceleration, and is determined in advance as a value according to the SOC of the battery 38.

According to the operating point determination method A, after the engine operating point PA is determined, an engine speed NeA associated with the engine operating point PA is determined eventually. In other words, according to this method A, the engine speed NeA is determined from the target engine power PeTA based on the required vehicle power PvR and the optimum fuel efficiency line Ls, without consideration to control (limit) the engine speed Ne at the initial stage of acceleration to a specific value for the purpose of a rubber band feeling measure. Then, using this engine speed NeA as a target value, the engine speed Ne during acceleration is controlled.

According to the present embodiment, when an acceleration request A that does not correspond to the acceleration request B is issued (i.e., an acceleration request that does not require a measure against the rubber band feeling is issued), the operating point determination method A described above is used. It can be said that, at the time of acceleration associated with the acceleration request A, there is no problem in terms of improving the feeling of acceleration, even if the engine speed NeA determined based on the operating point determination method A is used as a target value.

On the other hand, if the operating point determination method A is used when the acceleration request B (i.e., an acceleration request requiring a rubber band feeling measure) is issued from a state in which the engine speed Ne is lower than the specific NeX (including an engine stop state), the engine speed Ne inadvertently exceeds the specific NeX at the initial stage of acceleration. The reason for this is that, in order to satisfy the acceleration request B, which requires such a large required vehicle power PvR that requires a rubber band feeling measure, the engine power Pe required for the internal combustion engine 20 also becomes high, and as a result, in terms of the engine speed Ne, an engine speed Ne within the engine speed range in which the engine sound is heard inside the vehicle is required.

Measures at the Initial Stage of Acceleration Associated with Acceleration Request B In the acceleration feeling improvement control according to the present embodiment, when the ECU 52 determines that the engine speed Ne0 at the time of detection of the acceleration demand B is lower than the specific NeX, the ECU 52 sets the specific NeX as an initial target engine speed NeIT (hereinafter, abbreviated as an "initial target NeIT") for the acceleration. As just described, according to the present embodiment, when the engine speed Ne0 at the time of detection of the acceleration request B is lower than the specific NeX, the initial target NeIT, which is the engine speed Ne that should be controlled at the initial stage of acceleration, is determined actively (first).

An acceleration time period prior to reaching the initial target NeIT at the time of acceleration associated with the acceleration request B (i.e., a time period from the detection of the acceleration request B until reaching the initial target NeIT) is referred to as a "first acceleration time period" (see FIG. 8 described below). In addition, a method of determining an engine operating point used when the acceleration request B is issued is referred to as an "operating point determination method B". In this first acceleration time period, the ECU 52 controls the internal combustion engine 20 in accordance with a target engine power PeTB based on the initial target NeIT, and supplies, to the MG2, a battery power Pb (electric power) corresponding to the difference obtained by subtracting the target engine power PeTB from the required vehicle power PvR. It should be noted that, the "target engine power PeTB based on the initial target NeIT" mentioned here corresponds to an example of the "first target engine power" according to the present disclosure.

As shown in FIG. 3, according to the operating point determination method B, the intersection point between the initial target NeIT (=the specific NeX) and the optimum fuel efficiency line Ls is determined as an engine operating point PB. The value on an equal power line LpB passing through this engine operating point PB is then determined as the target engine power PeTB.

It is assumed that the engine operating points A and B in the example shown in FIG. 3 are values associated with the same required vehicle power PvR. The target engine power PeTB determined using the operating point determination method B on the basis of the initial target NeIT limited so as to be equal to the specified NeX becomes smaller than the target engine power PeTA determined using the operating point determination method A, as can be seen from FIG. 3. Thus, using the operating point determination method B in place of the operating point determination method A when the acceleration request B is issued means that the target engine power falls from PeTA to PeTB as indicated by an arrow Y in FIG. 3 as a result of moving the engine operating point on the optimum fuel efficiency line Ls such that the engine speed Ne at the initial stage of acceleration is limited so as not to exceed the specific NeX.

If the target engine power is simply reduced to PeTB when the acceleration request B is issued, the required vehicle power PvR cannot be met. Because of this, according to the present embodiment, as described above, the battery power Pb corresponding to the difference obtained by subtracting the target engine power PeTB from the required vehicle power PvR is supplied to the MG2. Thus, the shortage of power with respect to the required vehicle power PvR can be compensated by the battery power Pb (i.e., the power of the MG2).

Furthermore, in an example in which the internal combustion engine 20 is already operated when the acceleration request B is issued (i.e., in an example in which the hybrid mode has already been selected), the engine speed Ne0 at the time of detection of the acceleration request B may be the specific NeX or higher. In this example, according to the acceleration feeling improvement control, this engine speed Ne0 is set as the initial target NeIT. Therefore, in this example, when the initial target NeIT is set, the engine speed Ne immediately reaches the initial target NeIT. In other words, in this example, the first acceleration time period does not exist.

Control During Second Acceleration Time Period

With respect to the acceleration in response to the acceleration demand B, an acceleration time period at or after reaching the initial target NeIT (i.e., a time period from reaching the initial target NeIT to ending the acceleration) is referred to as a "second acceleration time period" (see FIG. 8 described below).

When the engine speed Ne reaches the initial target NeIT (=the specific NeX), the engine noise starts to be heard by the occupant. In the acceleration feeling improvement control according to the present embodiment, an "engine speed change index value ΔNe" is used for the measures against the rubber band feeling for the second acceleration time period at or after reaching the initial target NeIT. The engine speed change index value (hereinafter abbreviated as a "change index value") ΔNe is a rate of hereinafter increase [rpm/(km/h)] of the engine speed Ne [rpm] with respect to an increase in the vehicle speed V [km/h]. That is to say, the change index value ΔNe is a positive value.

During the second acceleration time period, the ECU 52 sets a target engine speed NeT (hereinafter, abbreviated as a "target NeT") based on the change index value ΔNe using the initial target NeIT as the initial value of the target NeT. The setting (calculation) of the target NeT based on the change index value ΔNe can be performed by, for example, the following method. That is to say, the ECU 52 uses the initial target NeIT (=the specific NeX) as the initial value of the target NeT. Then, according to the following Equation 1, every time the vehicle speed V increases by 1 km/h, the ECU 52 calculates the current value of the target NeT while adding the change index value ΔNe to the last value of the target NeT. It should be noted that, where the change index value ΔNe changes in accordance with the vehicle speed V as in a second embodiment described below, each time the vehicle speed V increases by 1 km/h, the change index value ΔNe associated with the current vehicle speed V is added to the last value of the target NeT.

$$NeT \text{ (current value)} = NeT \text{ (last value)} + \Delta Ne \quad (1)$$

When the engine speed Ne0 at the time of detection of the acceleration request B is lower than the specific NeX, the initial target NeIT used for the calculation of the target NeT during the second acceleration time period is the specific NeX. When, on the other hand, the engine speed Ne0 at the time of the detection is equal to or higher than the specific NeX, the initial target NeIT used for the calculation is the engine speed Ne0.

Figure 4:
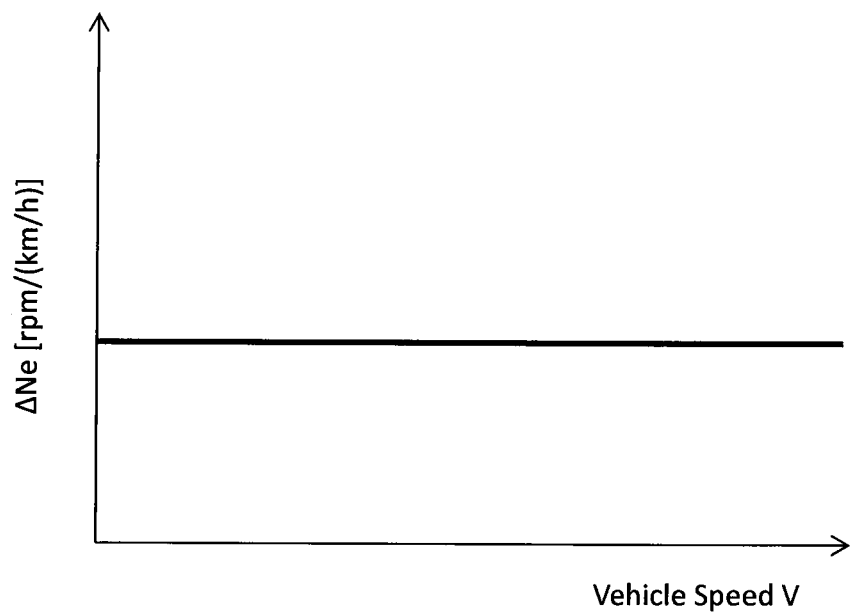
FIG. 4 is a graph showing the characteristics of a change index value ΔNe used in the first embodiment with respect to the vehicle speed V.

FIG. 4 is a graph showing the characteristics of the change index value ΔNe used in the first embodiment with respect to the vehicle speed V. According to the present embodiment, as an example, the change index value ΔNe is set to be constant regardless of the vehicle speed V during the second acceleration time period as shown in FIG. 4.

Figure 5:
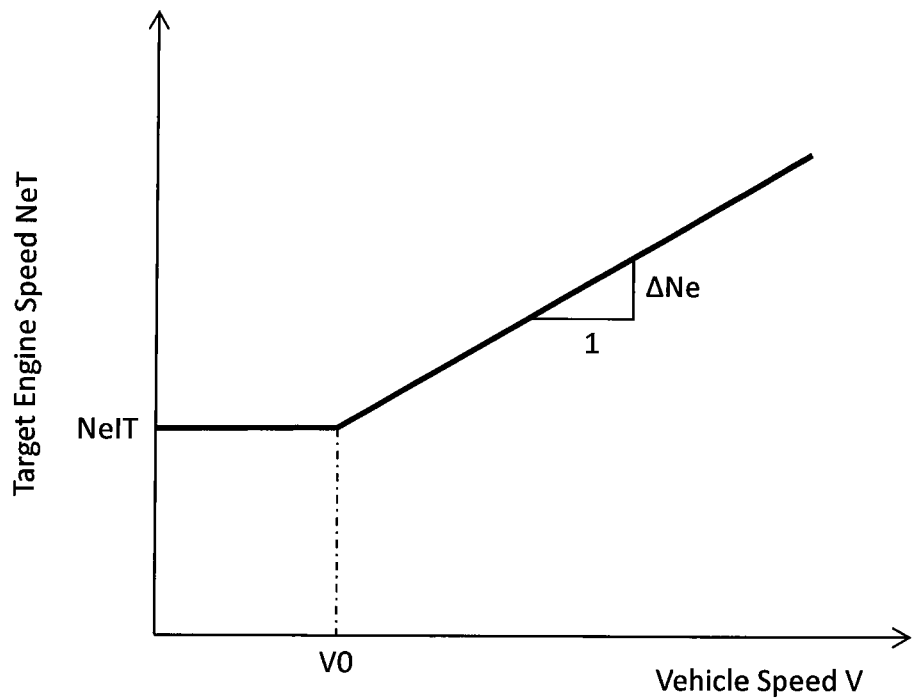
FIG. 5 is a graph used to describe a relationship between a target engine speed NeT and the vehicle speed V during a second acceleration time period in the first embodiment.

FIG. 5 is a graph used to describe a relationship between the target NeT and the vehicle speed V during the second acceleration time period in the first embodiment. A vehicle speed value V0 in FIG. 5 corresponds to a value of the vehicle speed V obtained when the engine speed Ne reaches the initial target NeIT at the time of acceleration associated with the acceleration request B. After the vehicle speed V reaches the vehicle speed value V0, the target NeT increases, with an increase in the vehicle speed V, along a straight line L1 having the change index value ΔNe as an inclination as shown in FIG. 5. That is to say, the target NeT is increased by the change index value ΔNe every time the vehicle speed V increases by 11 cm/h.

As described above, adjusting the magnitude of the change index value ΔNe corresponds to adjusting the amount of increase in the engine speed Ne during the vehicle speed V increasing by 1 km/h. Therefore, by limiting the change index value ΔNe to a desired value, the time change rate dNe/dt of the engine speed during the second acceleration time period (hereinafter, also referred to as an "Ne rate") can be limited to any value.

Accordingly, the magnitude of the change index value ΔNe is determined in advance as a value suitable for the rubber band feeling measure for the second acceleration time period. Specifically, according to the present embodiment, the magnitude of the change index value Ne is determined in advance as a value that can satisfy a relationship in which the time change rate dNe/dt of the engine speed in the second acceleration time period is lower than the time change rate dNe/dt in the first acceleration time period (see the waveform of the engine speed Ne in FIG. 8 described below). Moreover, the ECU 52 sets the target engine speed NeT using the change index value ΔNe having a magnitude thus determined, and thereby limits the time change rate dNe/dt of the engine speed (i.e., the Ne rate) in the second acceleration time period such that the relationship described above is satisfied.

Furthermore, during the second acceleration time period, similarly to the first acceleration time period, the ECU 52 controls the internal combustion engine 20 in accordance with the "target engine power PeTB based on the target engine speed NeT", and supplies, to the MG2, the battery power Pb corresponding to the difference obtained by subtracting the target engine power PeTB from the required vehicle power PvR. It should be noted that the "target engine power PeTB based on the target engine speed NeT" mentioned herein corresponds to an example of the "second target engine power" according to the present disclosure.

1-3-2. Processing by ECU

Figure 6:
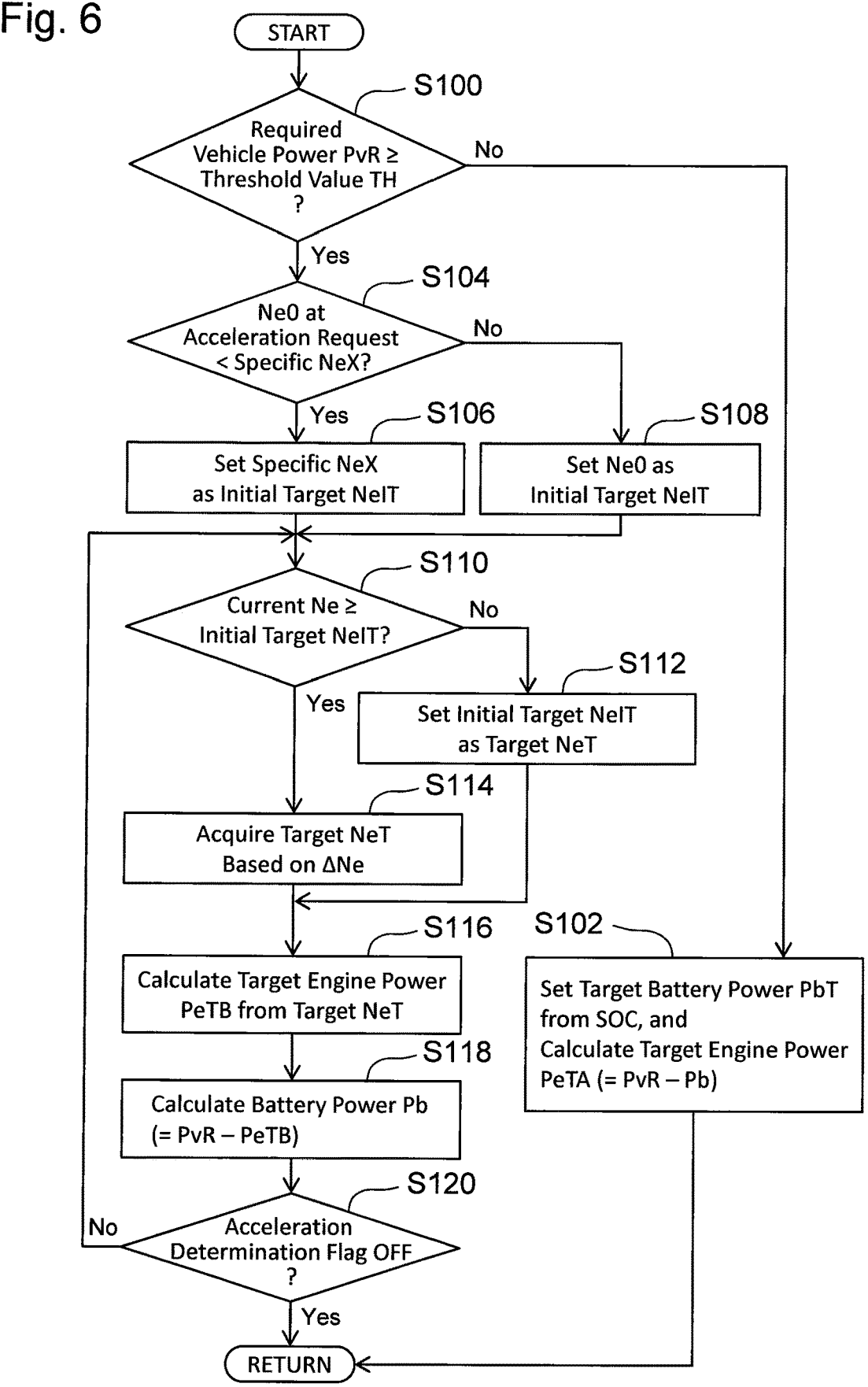
FIG. 6 is a flowchart showing a routine of the processing concerning a powertrain control during acceleration including an acceleration feeling improvement control according to the first embodiment.

FIG. 6 is a flowchart showing a routine of the processing concerning the powertrain control during acceleration including the acceleration feeling improvement control according to the first embodiment. When the ECU 52 uses the accelerator position sensor 58 to detect the depression of the accelerator pedal, the ECU 52 turns on an acceleration determination flag and starts the processing of the present routine.

According to the routine shown in FIG. 6, first, in step S100, the ECU 52 calculates a required vehicle power PvR on the basis of the accelerator position Acc and the vehicle speed V and determines whether or not the calculated required vehicle power PvR is not less than the threshold value TH. As described above, the required vehicle power PvR is an example of the "acceleration request index value".

If in step S100 the required vehicle power PvR is less than the threshold TH, that is, if it can be judged that the acceleration request A which is not a target of the rubber band feeling measure is issued, the processing then proceeds to step S102. In step S102, the ECU 52 uses the operating point determination method A described above to set a target battery power PbT based on the SOC and calculate a target engine power PeTA. It should be noted that the ECU 52 controls the PCU 54 such that the power according to the target battery power PbT which has been set is supplied to the MG2. Moreover, the ECU 52 calculates a target engine torque TeT from the calculated target engine power PeTA and an engine speed Ne that is at the intersection point (engine operating point) between the equal power line associated with the calculated target engine power PeTA and the optimum fuel efficiency line Ls (see FIG. 3). Then, the ECU 52 controls the internal combustion engine 20 (the throttle valve 22, the fuel injection valves 24 and the ignition device 26) such that the calculated target engine torque TeT is achieved.

If, on the other hand, in step S100 the required vehicle power PvR is equal to or greater than the threshold value TH, that is, if it can be judged that the acceleration request B which is the target of the rubber band feeling measure is issued, the processing then proceeds to step S104. The processing at or after step S104 corresponds to the processing concerning the acceleration feeling improvement control.

In step S104, the ECU 52 calculates an engine speed Ne0 at the time of detection of the acceleration request B using the crank angle sensor 56, and determines whether or not the calculated engine speed Ne0 is lower than the specific NeX. The ECU 52 stores a relationship between the specific NeX and the vehicle speed V as a map as shown in FIG. 2. The ECU 52 acquires the specific Nex according to the vehicle speed V at the time of detection of the acceleration request B from this kind of map.

If in step S104 the engine speed Ne0 is lower than the specific NeX, the processing then proceeds to step S106. Typically, when the acceleration request B is issued during the execution of the EV mode in which the internal combustion engine 20 is stopped (that is, during an engine intermittent stop), the determination result of step S104 becomes positive. In addition, this determination result becomes also positive during the internal combustion engine 20 being operating at an extremely low engine speed lower than the specific NeX in the hybrid mode. In step S106, the ECU 52 sets the specific Nex acquired in step S104 as the initial target NeIT. Thereafter, the processing proceeds to step S110.

If, on the other hand, in step S104 the engine speed Ne0 is equal to or higher than the specific NeX, that is, if the acceleration request B is detected when the internal combustion engine 20 is operating at engine speeds Ne equal to or higher than the specific NeX, the processing then proceeds to step S108. In step S108, the ECU 52 sets the engine speed Ne0 as the initial target NeIT. Thereafter, the processing proceeds to step S110.

In step S110, the ECU 52 determines whether or not the current engine speed Ne (current engine speed Ne) calculated by using the crank angle sensor 56 is equal to or higher than the initial target NeIT which is set in step S106 or S108.

If in step S110 the current engine speed Ne is lower than the initial target NeIT (i.e., if the internal combustion engine 20 is during the first acceleration time period prior to reaching the initial target NeIT), the processing then proceeds to step S112. In step S112, the ECU 52 sets, as the target NeT, the initial target NeIT (=the specific NeX) which is set in step S106. The initial target NeIT which is set in step S106 is used during the first acceleration time period. After step S112, the processing proceeds to step S116.

If, on the other hand, in step S110 the current engine speed Ne is equal to or higher than the initial target NeIT (i.e., if the internal combustion engine 20 is during the second acceleration time period at or after reaching the initial target NeIT), the processing then proceeds to step S114. When the processing proceeds to step S110 after step S108, both the current engine speed Ne and the initial target NeIT become equal to the engine speed Ne0. As a result, the determination result of step S110 immediately becomes positive, and the processing then proceeds to step S114.

In step S114, the ECU 52 acquires a target NeT during the second acceleration time period. During the second acceleration time period, the ECU 52 uses the Equation 1 described above to update the target NeT in association with an increase in the vehicle speed V. In this step S114, the latest target NeT is acquired. Thereafter, the processing proceeds to step S116.

In step S116, the ECU 52 calculates a target engine power PeTB associated with the target NeT acquired in step S112 or S114. For example, this calculation is performed using the operating point determination method B described with reference to FIG. 3 by taking the initial target NeIT as an example. As a result, a value on the equal power line (in the example shown in FIG. 3, LpB) passing through the intersection point between the target NeT and the optimum fuel efficiency line Ls (in the example shown in FIG. 3, the engine operating point PB) is calculated as the target engine power PeTB. The ECU 52 calculates a target engine torque TeT from the calculated target engine power PeTB and the target NeT, and controls the internal combustion engine 20 such that the calculated target engine torque TeT is achieved.

After step S116, the processing proceeds to step S118. In step S118, the ECU 52 calculates a battery power Pb corresponding to the difference obtained by subtracting the target engine power PeTB calculated in step S116 from the required vehicle power PvR calculated in step S100. Then, the ECU 52 supplies the calculated battery power Pb to the MG2. In more detail, the ECU 52 controls the PCU 54 such that this battery power Pb is supplied to the MG2. Thereafter, the processing proceeds to step S120.

In step S120, the ECU 52 determines whether or not the acceleration determination flag has been turned off (i.e., whether the acceleration of the vehicle has been ended or not). The acceleration determination flag is turned off when, for example, the amount of increase in the vehicle speed V decreases to a predetermined threshold value or less. When the acceleration determination flag is not turned off (i.e., the vehicle is during acceleration), the ECU 52 repeatedly executes the processing of step S110 and the subsequent steps. When, on the other hand, the acceleration determination flag is turned off, the ECU 52 ends the powertrain control at the time of acceleration according to the present routine.

1-4. Effect

Figure 7:
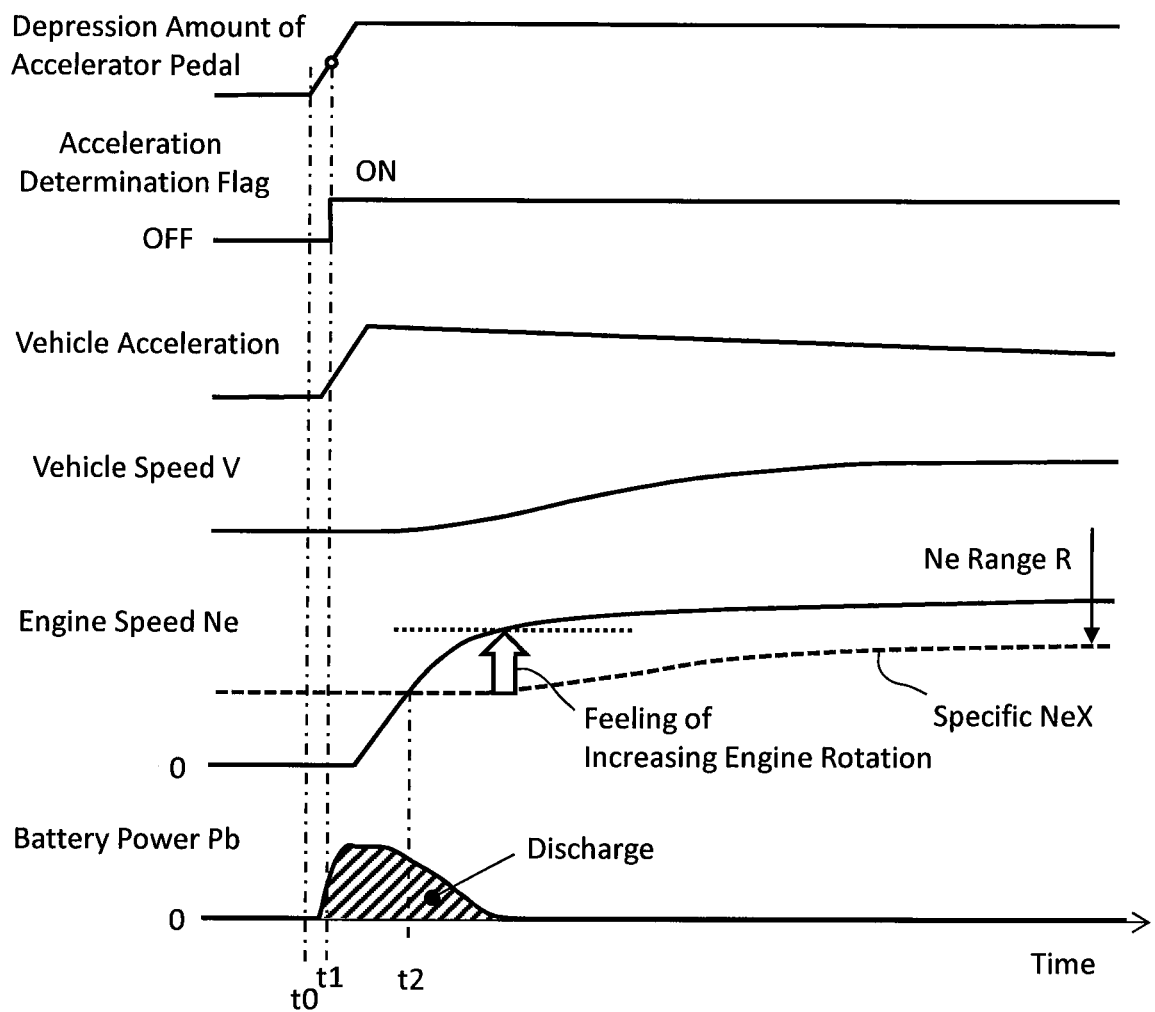
FIG. 7 is a time chart at the time of acceleration in a comparative example in which the acceleration feeling improvement control is not used when an acceleration request B is issued.

FIG. 7 is a time chart at the time of acceleration in a comparative example in which the acceleration feeling improvement control is not used when the acceleration request B is issued. FIG. 8 is a time chart at the time of acceleration in which the acceleration feeling improvement control according to the first embodiment is performed when the acceleration request B is issued. As an example, FIGS. 7 and 8 show the operation at the time of acceleration from the EV mode (i.e., from an engine intermittent stop state).

Figure 8:
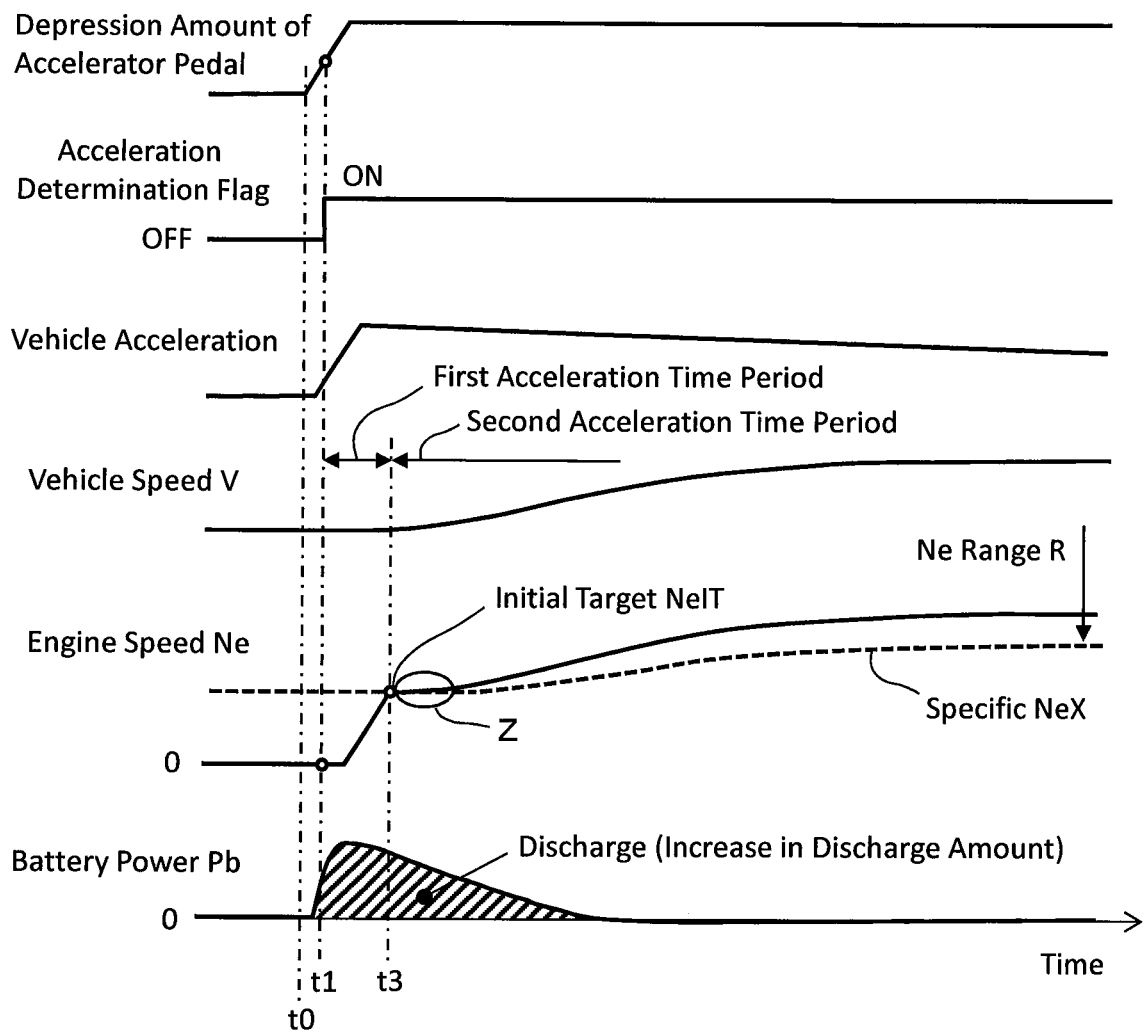
FIG. 8 is a time chart at the time of acceleration in which the acceleration feeling improvement control according to the first embodiment is performed when the acceleration request B is issued.

In each of the examples shown in FIGS. 7 and 8, a time point t0 corresponds to a time point at which depression of the accelerator pedal is started. The subsequent time point t01 corresponds to a time point at which the acceleration determination flag is turned on in response to the depression of the accelerator pedal, and at this time point t1, the current acceleration request is detected as the acceleration request B.

In the comparative example shown in FIG. 7, it is assumed that the operation point determination method A described above with reference to FIG. 3 is used to set the target battery power PbT during acceleration and calculate the target engine power PeTA. As already described, according to this method A, the target NeT according to the target engine power PeTA and the optimum fuel efficiency line Ls is determined eventually without taking into consideration for actively determining the initial target NeIT at the time of acceleration. Because of this, in the comparative example, at a time t2, the engine speed Ne inadvertently exceeds the specific NeX.

To be more specific, the engine speed Ne passes through the specific NeX in a state in which the time change rate dNe/dt of the engine speed (i.e., the slope of the waveform of the engine speed Ne in FIG. 7) is high. As a result, an engine sound that rises at a high time change rate dNe/dt (Ne rate) after the passage of the specific NeX starts to be heard by the occupant. This leads to giving the occupant a feeling of rapidly increasing the engine rotation (i.e., the rubber band feeling) at the initial stage of acceleration in which the vehicle speed V is not increased too much.

In contrast to the above, according to the first embodiment in which the acceleration feeling improvement control is performed, when the engine speed Ne0 at the time of detection of the acceleration request B (at the time point t1) is lower than the specific NeX as in the example shown in FIG. 8, the specific NeX which is the lower limit value of the engine speed range R (see FIG. 8) in which the engine sound can be heard in the vehicle interior is set as the initial target NeIT at the time of acceleration associated with the acceleration request B. As just described, according to the present embodiment, the initial target NeIT is set with taking into consideration the rubber band feeling measure, and the engine speed Ne at the initial stage of acceleration is thereby managed. Furthermore, in the first acceleration time period prior to reaching the initial target NeIT, the internal combustion engine 20 is controlled in accordance with the target engine power PeTB based on the initial target NeIT. Thus, in the initial stage of acceleration in response to the acceleration request B in which the rubber band feeling measure is required, it is possible to prevent the engine speed Ne from inadvertently exceeding the specific NeX. As a result, the rubber band feeling can be reduced and the feeling of acceleration can thus be improved.

Then, according to the acceleration feeling improvement control, in the first acceleration time period, the battery power PbT corresponding to the difference obtained by subtracting the target engine power PeTB from the required vehicle power PvR is supplied to the MG2. Thus, the vehicle power Pv that is insufficient with respect to the required vehicle power PvR as a result of determining the target engine power PeTB on the basis of the initial target NeIT (=the specific NeX) can be compensated by supplying the power (electric power) from the battery 38 to the MG2. Because of this, it becomes possible to perform the rubber band feeling measure without causing the shortage of the vehicle power Pv.

Furthermore, According to the present embodiment, the specific NeX used for the control in the first acceleration time period is set to be higher when the vehicle speed V is higher. As a result, it is possible to appropriately set the initial target NeIT with taking into consideration a change in the specific Nex according to the vehicle speed V having a large effect on the background noise in the vehicle interior.

Figure 9:
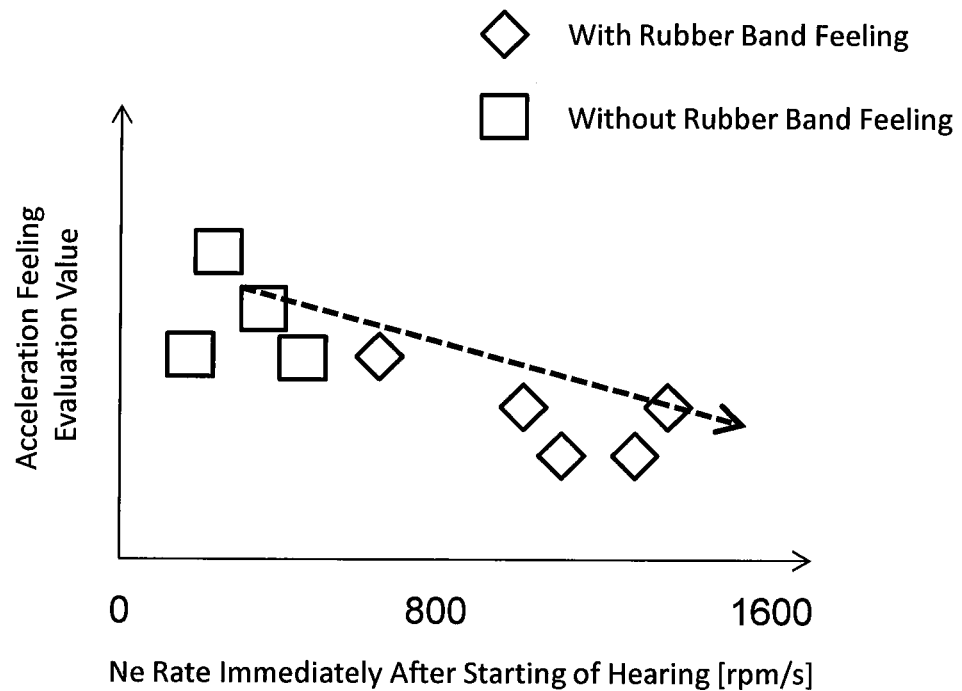
FIG. 9 is a graph showing a relationship between an Ne rate immediately after the start of hearing an engine sound and an acceleration feeling evaluation value.

Next, the effect of the acceleration feeling improvement control for the second acceleration time period will be described with additional reference to FIG. 9. FIG. 9 is a graph showing a relationship between the Ne rate immediately after the start of hearing the engine sound and an acceleration feeling evaluation value. The numerical value of the Ne rate (time change rate dNe/dt) used in FIG. 9 indicates the amount of increase in the engine speed Ne per second [s]. In addition, the acceleration feeling evaluation value on the vertical axis indicates that the greater the acceleration feeling evaluation value is, the better the feeling of acceleration is. The relationship shown in FIG. 9 represents the knowledge obtained by the earnest research by the inventor of the present application, and the relationship is obtained when the acceleration feeling improvement control according to the present embodiment is not used.

With respect to each plot point in FIG. 9, the diamonds correspond to the data obtained when the occupant recognizes the rubber band feeling, and the squares correspond to the data obtained when the occupant does not recognize the rubber band feeling. From the distribution of the plot points in FIG. 9, it can be seen that the acceleration feeling is not good when the Ne rate is high immediately after the start of hearing (i.e., immediately after reaching the specific NeX). That is to say, it can be seen that the Ne rate immediately after the start of hearing (i.e., the time change rate dNe/dt of the engine speed immediately after exceeding the specific NeX) greatly affects the feeling of acceleration. In other words, it can be seen that, when the Ne rate immediately after the start of hearing is high, the feeling that the increase of engine sound precedes the rising of the vehicle acceleration G (namely, the rubber band feeling) is conspicuous.

Therefore, from the knowledge shown in FIG. 9, during acceleration from a state in which the engine speed Ne0 at the time of detection of the acceleration request B is lower than the specific NeX (e.g., the engine intermittent stop state), it is favorable to adopt a control policy in which the engine speed Ne is temporarily held in a range around the specific NeX (e.g., a range indicated by an arrow Z in FIG. 8) and then the engine speed Ne is gradually increased at an appropriately limited Ne-rate. In view of this point, according to the present embodiment, the following engine speed control is performed for the rubber band feeling measure in the second acceleration time period (in particular, in the initial stage of the second acceleration time period (more specifically, a time period in which, if the measure is not made as in the example shown in FIG. 7, the rate of increase in the engine speed Ne becomes high)).

That is to say, according to the present embodiment, as shown in FIG. 8, the time change rate dNe/dt (the Ne rate) in the second acceleration time period is limited so as to be lower than the time change rate dNe/dt in the first acceleration time period. In addition, the engine speed Ne during acceleration is controlled such that an inflection point occurs at a time point t3 of reaching the initial target NeIT as shown in FIG. 8. This can effectively reduce the Ne rate in an engine speed range around the specific NeX, which is an engine speed range in which the effect to reduce the rubber band feeling is high. Therefore, it is possible to prevent the engine sound from abruptly starting to be heard with a high Ne rate after the arrival of the specific NeX. In other words, it is possible to provide an engine speed control according to the above described control policy based on the knowledge shown in FIG. 9. In addition, according to the present embodiment, it is determined whether or not the engine speed Ne has reached the initial target NeIT equal to the specific NeX in the initial stage of acceleration. Because of this, the engine speed control according to the control policy can be reliably performed.

Furthermore, according to the acceleration feeling improvement control of the present embodiment, when the engine speed Ne0 at the time of detection of the acceleration request B is equal to or higher than the specific NeX, the engine speed Ne0 is set as the initial target NeIT. That is to say, when the engine speed Ne0 is equal to or higher than the specific NeX, processing to set the specific NeX as the initial target NeIT is not performed. Thus, when the engine speed Ne0 is equal to or higher than the specific NeX, it is possible to avoid the uncomfortable feeling that the engine speed Ne temporarily decreases even during acceleration. In addition, according to the routine shown in FIG. 6, even when the engine speed Ne0 is equal to or higher than the specific NeX, the engine speed control using the change index value ΔNe is similarly performed using this engine speed Ne0 as the initial value. Therefore, regardless of whether the engine speed Ne0 is high or low with respect to the specific NeX, it is possible to reduce the rubber band feeling to improve the feeling of acceleration.

2. Second Embodiment

Next, a second embodiment according to the present disclosure will be described with reference to FIGS. 10 and 11.

An acceleration feeling improvement control according to the second embodiment is different from the acceleration feeling improvement control according to the first embodiment in the setting of the engine speed change index value ΔNe. FIG. 10 is a graph showing the characteristics of the change index value ΔNe used in the second embodiment with respect to the vehicle speed V. In the present embodiment, the change index value ΔNe is set to be higher when the vehicle speed V is higher. More specifically, in an example shown in FIG. 10, the change index value ΔNe is represented by a linear equation of the vehicle speed V so as to be linearly higher when the vehicle speed V is higher.

When the engine speed Ne in the first acceleration time period and the second acceleration time period (in particular, in the initial stage of the second acceleration time period) is controlled (limited) by the acceleration feeling improvement control according to the first embodiment, the amount of discharger of the battery 38 in the initial stage of acceleration tends to increase as shown in FIG. 8. As a result, there is a concern that the power balance of the battery 38 may deteriorate.

With respect to the issue as described above, the following effects can be obtained by setting the change index value ΔNe according to the second embodiment. FIG. 11 is a time chart at the time of acceleration in which the acceleration feeling improvement control according to the second embodiment is performed when the acceleration request B is issued. The example shown in FIG. 11 is different from the example shown in FIG. 8 in which the setting shown in FIG. 4 is used, in that the change index value ΔNe having the setting shown in FIG. 10 is used.

Figure 10:
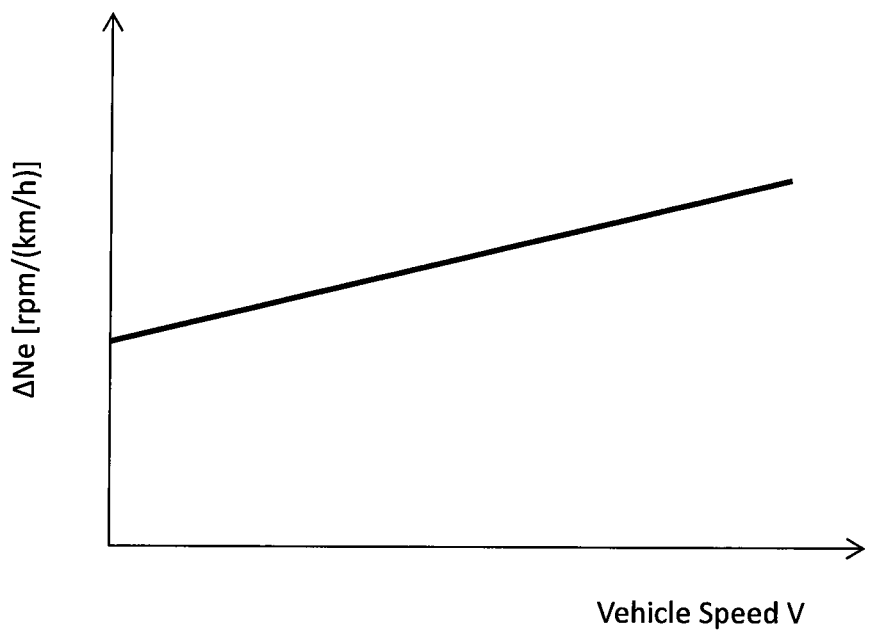
FIG. 10 is a graph showing the characteristics of the change index value ΔNe used in a second embodiment of the present disclosure with respect to the vehicle speed V.
Figure 11:
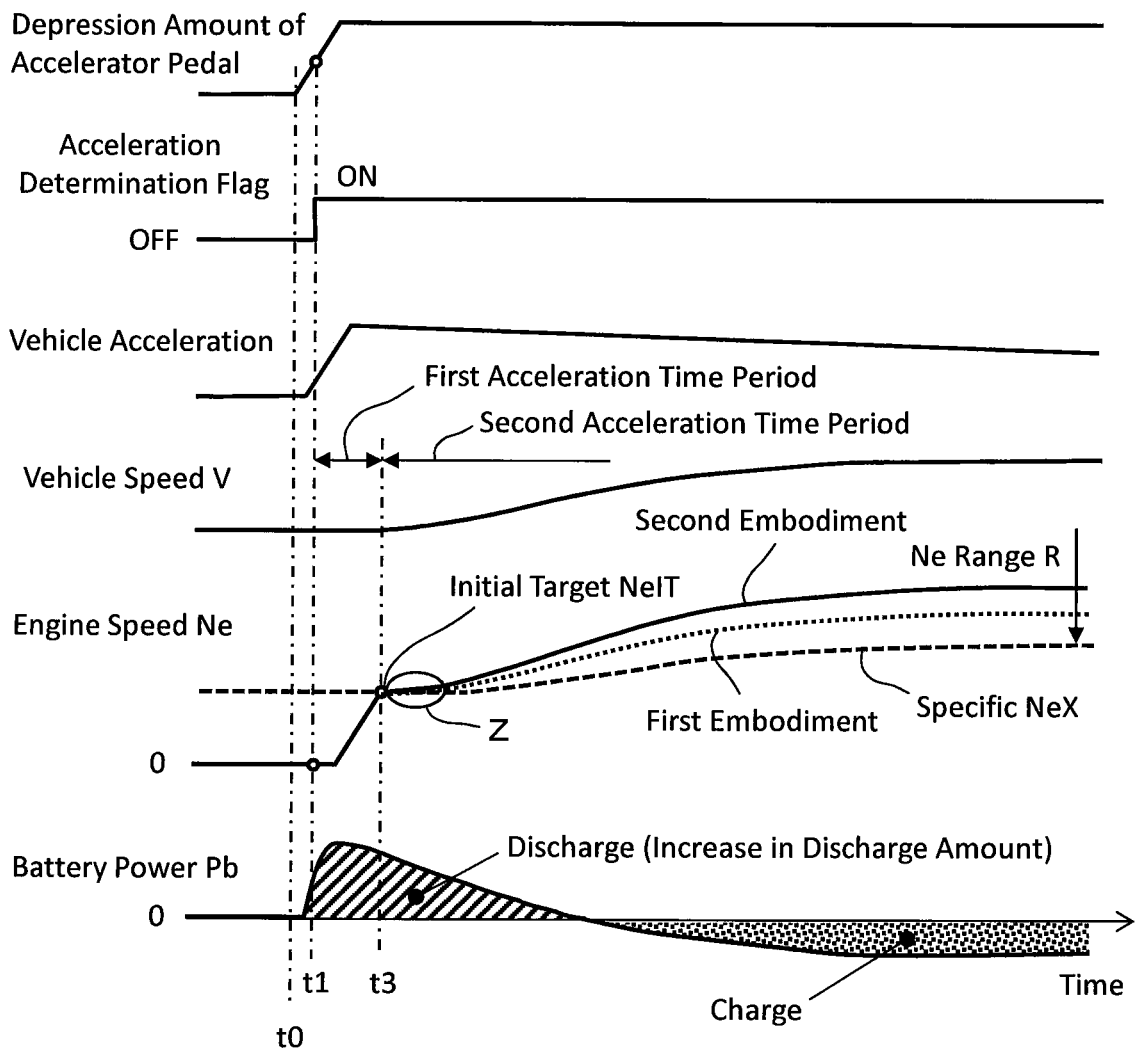
FIG. 11 is a time chart at the time of acceleration in which the acceleration feeling improvement control according to the second embodiment is performed when the acceleration request B is issued.

Increasing the change index value ΔNe as the vehicle speed V increases as in the setting shown in FIG. 10 means increasing the amount of increase in the target NeT with respect to the increase of 1 km/h of the vehicle speed V as the vehicle speed V increases. Therefore, according to the setting shown in FIG. 10, as compared to the setting according to the first embodiment in which the change index value ΔNe is constant regardless of the vehicle speed V (see FIG. 4), it is possible to achieve the characteristics that the target NeT can be made higher in the later stage of the second acceleration time period while the target NeT is kept low in the initial stage of the second acceleration time period similarly to the setting shown in FIG. 4. As a result, as in the example shown in FIG. 11, in the later stage of the second acceleration time period, it is possible to easily charge the battery 38 using the electric power generated by the engine operation at high engine speeds Ne.

Therefore, according to the present embodiment, by using the setting shown in FIG. 10 and appropriately setting the magnitude of the change index value ΔNe, it is possible to improve the power balance of the battery 38 during acceleration while appropriately lowering the Ne rate using a relatively low change index value ΔNe in the initial stage of the second acceleration time period.

Additionally, the powertrain system according to the present disclosure is not limited to the power-split hybrid system shown in FIG. 1 as long as it includes an internal combustion engine and electric motor to drive a vehicle, and may be, for example, another type of hybrid system, such as a so-called parallel hybrid system.

What is claimed is:

1. A powertrain system comprising:
an internal combustion engine configured to drive a vehicle;
an electric motor configured to drive the vehicle;
a battery configured to store electric power supplied to the electric motor; and
a control device configured to control the internal combustion engine and the electric motor,
the control device being configured, where an engine speed at a time of detection of an acceleration request in which an acceleration request index value correlated with a required vehicle power is greater than or equal to a threshold value is lower than a specific engine speed, to:
set the specific engine speed as an initial target engine speed for an acceleration associated with the acceleration request; and
in a first acceleration time period being an acceleration time period before reaching the initial target engine speed, control the internal combustion engine in accordance with a first target engine power based on the initial target engine speed and supply, to the electric motor, a battery power corresponding to a difference obtained by subtracting the first target engine power from the required vehicle power,
the specific engine speed being a value predetermined as a lower limit value of an engine speed range in which engine sound of the internal combustion engine is heard inside the vehicle.

2. The powertrain system according to claim 1,
wherein the higher a speed of the vehicle is, the higher the specific engine speed is.

3. The powertrain system according to claim 1,
wherein the control device is further configured to limit a time change rate of the engine speed in a second acceleration time period at or after reaching the initial target engine speed such that the time change rate in the second acceleration time period becomes lower than the time change rate in the first acceleration time period.

4. The powertrain system according to claim 3,
wherein the powertrain system is configured to charge, into the battery, electric power generated by an engine power of the internal combustion engine, wherein the control device is further configured, in the second acceleration time period, to:

set a target engine speed based on an engine speed change index value being a rate of increase in the engine speed with respect to an increase in a speed of the vehicle while using the initial target engine speed as an initial value of the target engine speed;

control the internal combustion engine in accordance with a second target engine power based on the target engine speed; and supply, to the electric motor, a battery power corresponding to a difference obtained by subtracting the second target engine power from the required vehicle power, and wherein the higher the speed of the vehicle is, the higher the engine speed change index value is.

5. The powertrain system according to claim 1, wherein the control device is further configured, where the engine speed at the time of detection of the acceleration request is equal to or higher than the specific engine speed, to set the engine speed at the time of detection of the acceleration request as the initial target engine speed for the acceleration associated with the acceleration request.

* * * * *